United States Patent [19]

Tiedeman, Jr.

[11] 3,895,299

[45] July 15, 1975

[54] APPARATUS FOR AUTOMATIC ADJUSTMENT OF AGC REFERENCE VOLTAGE

[75] Inventor: Irvin Bruce Tiedeman, Jr., Nashua, N.H.

[73] Assignee: Sanders Associates, Inc., South Nashua, N.H.

[22] Filed: Apr. 8, 1974

[21] Appl. No.: 459,153

[52] U.S. Cl. .......... 325/400

[51] Int. Cl.² .......... H04B 1/16

[58] Field of Search .......... 325/326, 397, 400, 407, 325/363; 343/5 GC

[56] References Cited

UNITED STATES PATENTS

| | | | |
|---|---|---|---|
| 2,853,601 | 9/1958 | McKenna et al. | 325/407 |
| 2,958,772 | 11/1960 | Mandel | 325/326 |
| 3,789,405 | 1/1974 | Nielson | 343/5 GC |

*Primary Examiner*—George H. Libman
*Attorney, Agent, or Firm*—Louis Etlinger; Richard I. Seligman

[57] ABSTRACT

In a system including an AGC circuit responsive to broadband RF signals, adjustment of the AGC circuit to maintain the signal in a particular incremental frequency band constant is achieved by monitoring the output from a receiver as the AGC reference voltage is intentionally changed and then generating an error voltage, if required.

4 Claims, 2 Drawing Figures

APPARATUS FOR AUTOMATIC ADJUSTMENT OF AGC REFERENCE VOLTAGE

BACKGROUND OF THE INVENTION

In a patent application, Ser. No. 446,570, filed Feb. 21, 1974 for a "Jamming Signal Cancellation System," assigned to the assignee of the present application, there is disclosed a system for improved radar performance in a jamming environment whereby received broadband signals are processed by circuitry which is amplitude sensitive. Accordingly, AGC circuitry is employed. For this application it is desired to maintain the signal level constant in a particular incremented frequency band using AGC.

In conventional AGC circuits, the average broadband RF level is detected, and compared to a fixed dc reference voltage in order to determine the level of the AGC control voltage. This type of AGC circuit maintains the average output level of the RF signals at a constant value. However, in certain applications it is desired to maintain the portion of the signal in a narrow band at a constant value. In these applications this cannot be done simply by inserting a narrow band filter before the AGC detector, because the signal is too rapidly frequency modulated. Yet the variations in its envelope occur slowly enough to be managed by the loop described herein. Thus, the AGC reference voltage requires readjustment in accordance with the variance of the relationship of the average RF level in the narrow frequency band to that average level in the broadband RF spectrum.

SUMMARY OF THE INVENTION

Accordingly, it is an object of this invention to provide an improved AGC circuit which is responsive to changes in spectrum of the input signal.

It is another object of this invention to provide an AGC circuit having automatic adjustment of the AGC reference voltage.

Briefly, in a system including amplitude sensitive circuitry, a signal is inserted in the AGC circuit to increase the AGC reference level while the residual output of a receiver is monitored to see if changes therein due to the changes in AGC reference level are equal from both the increase and decrease in AGC reference level. If unequal, an error signal consisting of the integrated difference of the residual signal is applied to the AGC circuit.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

Figure 1:
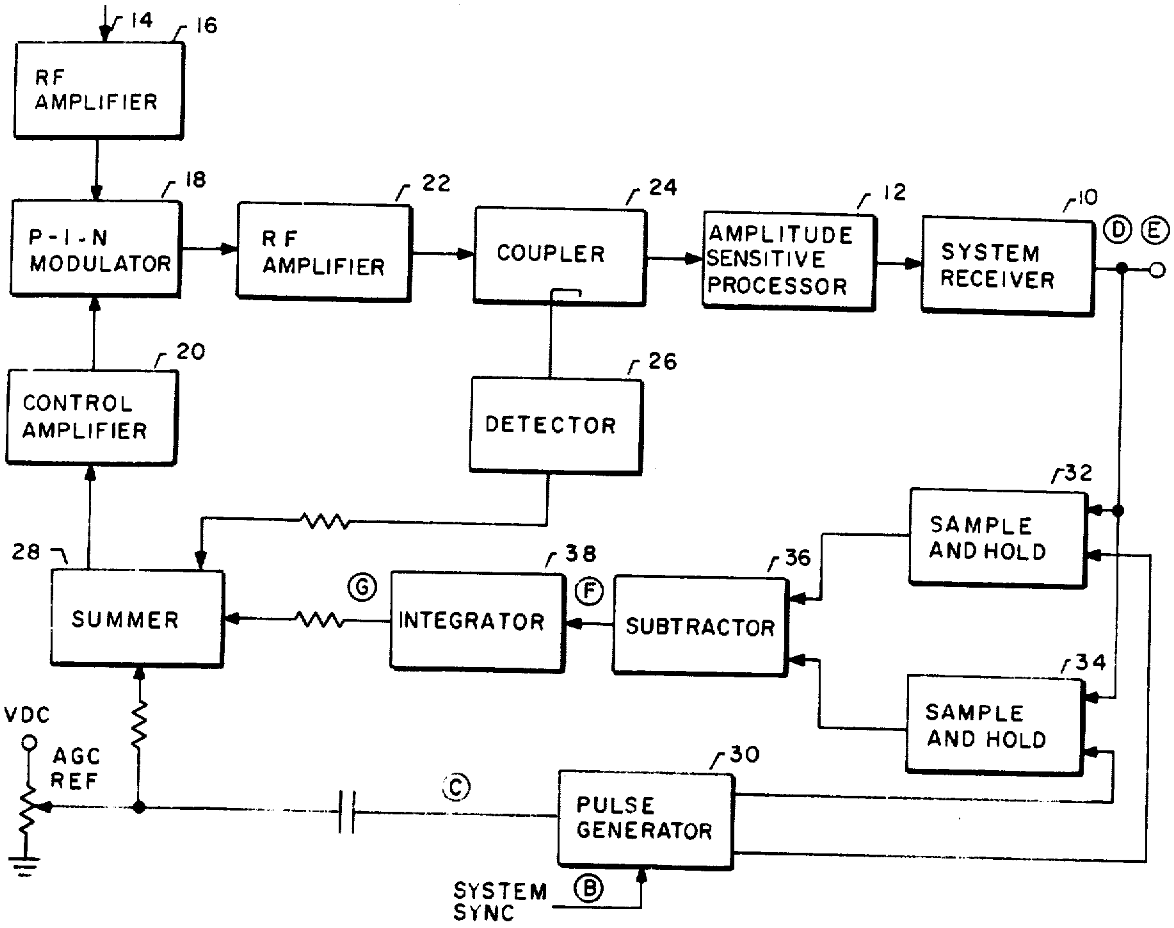
FIG. 1 is a block diagram of the invention.

Referring now to FIG. 1, there is illustrated thereby a preferred embodiment of the invention. The object of this circuitry is to ascertain when the residual output of a receiver 10 is minimized. For illustration purposes only, the invention is disclosed for a radar application in which the input to the system is broadband and where it is necessary to hold a narrow band constant.

The system receiver 10 for this application is a conventional narrow-band radar receiver.

The input to receiver 10 is from an amplitude sensitive processing circuitry 12 the specifics of which have no bearing on this invention other than that the input thereto should be at a predetermined level over a particular narrow-band frequency range.

The input signal 14 to the system is amplified by an RF amplifier 16 and applied to an attenuator 18 such as a p-i-n modulator. P-i-n modulator 18 is controlled by an output from a control amplifier 20 thereby providing AGC. The output from modulator 18 is amplified by RF amplifier 22 and applied to the amplitude sensitive processor 12 via a coupler 24.

Part of the output from RF amplifier 22 is applied via coupler 24 to a detector 26 and the detected envelope coupled to control amplifier via a summer 28 as in conventional AGC circuits.

The objects of the invention are achieved by keeping the residual output of the receiver 10 at a minimum. This is accomplished in this embodiment by inserting prior to the transmitted radar pulse (shown in waveform A of FIG. 2) a signal (AGC perturbation shown in waveform C of FIG. 2) from a pulse generator 30 to increase and decrease the AGC reference level. This signal is applied to control amplifier 20 via summmer 28. This perturbation causes the RF level into the amplitude sensitive processor 12 to alternately increase and decrease.

Figure 2:
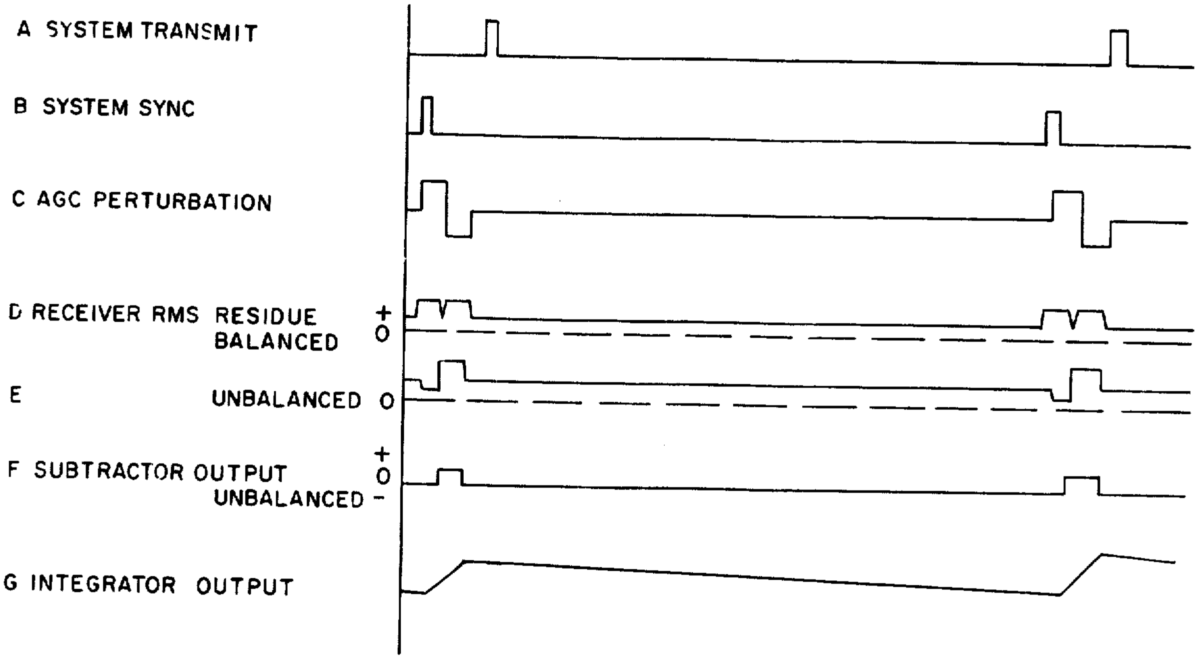
FIG. 2 is a series of waveforms illustrating operation of the circuit of FIG. 1.

If the level of the AGC reference voltage is correct the residual output will increase equally during both pulses as shown by the receiver RMS residue waveform (waveform D of FIG. 2). If the level of the AGC reference voltage is incorrect, that is, there is unbalance in the system, then one pulse may increase more than the other, or may increase and the other decrease as shown in waveform E.

The output from the system receiver 10 is applied to a pair of sample and hold circuits 32 and 34 each of which is enabled by a different one of the pulses from pulse generator 30. Note a double perturbation pulse is required to determine if an error in AGC reference exists and, if it does, the polarity or sense of this error and its magnitude. Thus, the sample and hold circuit are only exemplary means of performing the error sensing. The outputs from the sample and hold circuits 32, 34 are applied to a subtractor 36 or comparator the output from which is applied to an integrator 38. That is, the sample and hold circuits are sequentially turned on to subtract the envelope of one residual pulse from the other. The output from integrator 38 is applied to control amplifier 20 via summer 28. Typical outputs from subtractor 36 and integrator 38 for the example illustrated are shown by waveforms F and G, respectively, of FIG. 2.

Although the invention has been described in conjunction with a particular arrangement, the AGC adjustment technique is applicable to any situation wherein the AGC circuit must respond to broadband RF signals and yet maintain an AGC level at the average of a particular incremented frequency band. Thus, it is to be understood that the embodiment shown is to be regarded as illustrative only and that many variations and modifications can be made without departing from the principles of the invention herein disclosed and defined by the appended claims.

I claim:

1. In a system including an AGC circuit having an AGC reference voltage, broadband amplitude sensitive signal processing means coupled to said AGC circuit and a narrow-band receiver coupled to said signal processing means, apparatus for providing adjustment of the AGC reference voltage to maintain the input signal in a particular incremental frequency band constant as the spectrum of the input signal changes, comprising:

means for generating a signal to increase and decrease the AGC reference level;

means for applying said generated signal to the AGC circuit;

means for monitoring the residual output from the receiver whereby if the level of the AGC reference voltage is correct the residue monitored at the receiver output will increase equally during the increased and decreased AGC reference level; and means for adjusting the AGC circuit in accordance with the monitored output of the receiver.

2. Apparatus as defined in claim 1, wherein said means for adjusting the AGC circuit includes means for ascertaining the difference in residual output of the receiver due to increasing and decreasing the AGC reference voltage.

3. Apparatus as defined in claim 2, whereby said means for adjusting the AGC circuit further includes means for integrating the output from said difference ascertaining means and means for applying the output from said integrating means to the AGC circuit.

4. Apparatus defined in claim 3, wherein said means for ascertaining the difference in residual output of the receiver includes first and second sample and hold circuits coupled to the output of the receiver and means for enabling said sample and hold circuits by the signals from said means for generating a signal to increase and decrease the AGC reference level, and a subtractor coupled to the outputs of said sample and hold circuits.

* * * * *

UNITED STATES PATENT OFFICE
CERTIFICATE OF CORRECTION

PATENT NO. : 3,895,299

DATED : July 15, 1975

INVENTOR(S) : Irvin Bruce Tiedeman, Jr.

It is certified that error appears in the above-identified patent and that said Letters Patent are hereby corrected as shown below:

Column 1, Line 42 After "increase" insert --and decrease--.

Signed and Sealed this

***thirtieth* Day of *December 1975***

[SEAL]

*Attest:*

RUTH C. MASON
*Attesting Officer*

C. MARSHALL DANN
*Commissioner of Patents and Trademarks*